April 20, 1965 W. C. TAYLOR 3,179,727
METHOD OF FORMING SHAPED INSULATION MATERIALS
Original Filed Nov. 23, 1956
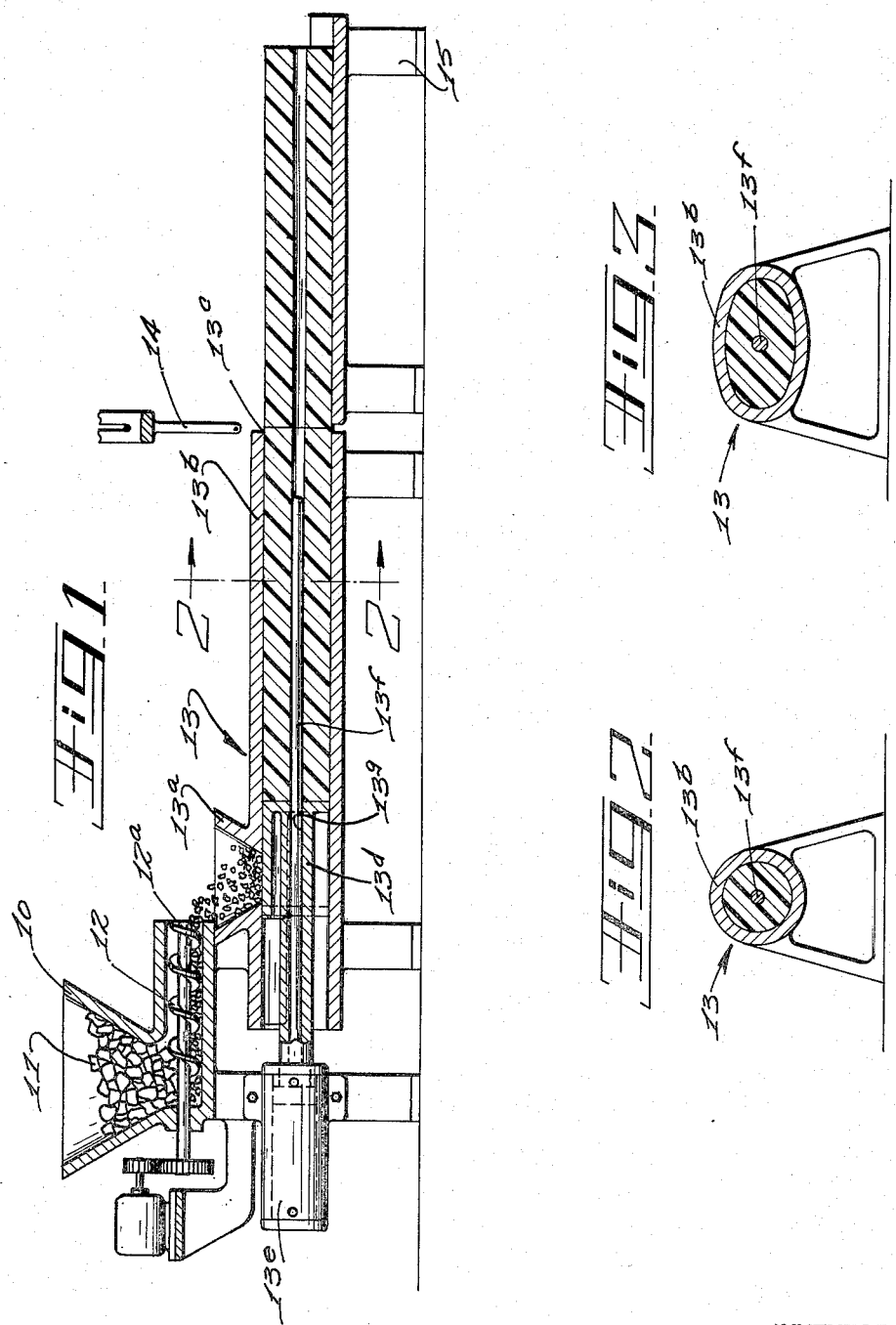
INVENTOR
WILLIAM C. TAYLOR
BY
ATTORNEYS United States Patent Office 3,179,727
Patented Apr. 20, 1965

3,179,727
METHOD OF FORMING SHAPED INSULATION MATERIALS
William C. Taylor, Toledo, Ohio, assignor to Owens-Corning Fiberglas Corporation, a corporation of Delaware
Continuation of application Ser. No. 624,053, Nov. 23, 1956. This application Dec. 30, 1960, Ser. No. 79,923
11 Claims. (Cl. 264—148)

This application is a continuation of my copending application Serial No. 624,053, filed November 23, 1956, now abandoned.

This invention relates in general to an improved method of forming shaped thermal insulating bodies from cementitious materials, and particularly to a method for forming shaped insulating bodies by a substantially continuous process.

Heretofore, it has not been possible to commercially produce shaped elements of cementitious materials by such a continuous process. Methods employed in the prior art have required the filling of a suitable mold structure with a cementitious slurry, which had to remain with such slurry until the slurry became sufficiently hardened to be a self-supporting structure. Hence, to increase production rates, it was necessary to employ a large number of individual molds. Naturally, this gave rise to an attendant increase in both capital investment and maintenance expense.

Accordingly, it is a primary object of this invention to provide a method for continuously forming shaped thermal insulating materials, characterized by the elimination of the necessity of providing an individual mold for each particular element to be shaped from a slurry of cementitious material.

A particular object of this invention is to provide an improved method for forming shaped cementitious bodies by a continuous extrusion process.

Another object of this invention is to provide a method whereby calcium silicate insulating materials of practically any desired apparent density may be continuously extruded as a shaped formation.

A further object of the present invention is the provision of a method for continuously producing by an extrusion process, cementitious thermal insulating materials having a tubular configuration.

The specific nature of this invention, as well as other objects and advantages thereof, will become apparent to those skilled in the art from the following detailed description, taken in conjunction with the annexed drawings on which, by way of example only, are illustrated the preferred embodiments of this invention.

FIG. 1 is a schematic sectional view of one form of apparatus capable of carrying out the method of this invention.

FIG. 2 is a sectional view taken in the plane 2—2 of FIG. 1.

FIG. 3 is a view similar to FIG. 2, but representing a modified configuration of the extrusion chamber.

Generally speaking, the method of this invention embodies the steps of forming a slurry of suitable ingredients to produce a desired cementitious material, such as an aqueous slurry of finely dividend lime and silica, which may have a water to solids weight ratio of approximately 1:1 to 9:1, and partially reacting such slurry preferably under the activating influence of heat and, in some instances, heat and pressure, to thus convert the slurry by endothermic reaction conditions into a mass having a plastic or pliable or putty-like consistency. Additionally, fibrous materials may oftentimes be dispersed within the slurry in order to enhance the suspending properties of the slurry, particularly when thin slurries are used. Fibrous materals such as spiculated chrysotile, amosite, bagasse, and other similar materials have been effectively utilized for this purpose. Following the transition or transformation of the slurry to a putty-like mass, it is chopped or shredded by any conventional mechanism to separate the mass into discrete pieces or lumps, each of which still retains a putty-like consistency. Successive charges of the putty-like pieces are then fed into one end of an axially elongated extrusion chamber, which defines an extruder orifice at its opposite end. Sequentially with the feeding of such charges, the putty-like pieces or lumps within the extrusion chamber are subjected to intermittent and repeated axial impaction, and this impaction effects both a consolidation and shaping of the pieces or lumps, and a step-by-step extrusion of the shaped formation from the extruder orifice. The extruded formation may then be severed into suitable lengths by any conventional cutting device, and the severed lengths subjected to further heat and/or pressure to complete the reaction between the cementitious materials and harden the formation sufficiently for structural insulating purposes.

Referring particularly to FIG. 1, there is shown a suitable hopper 10 containing a supply of discrete pieces or lumps 11 of partially reacted cementitious materials, such as hydrous calcium silicate forming materials or the like, which have been previously partially reacted from an aqueous slurry of such materials to a plastic or putty-like consistency by the application of conventionally applied heat and/or pressure. Hopper 10 defines an open bottom communicating with a feed screw 12 which feeds the pieces 11 to its output end 12a, from which the pieces are discharged and fall into a hopper 13a which, in turn, supplies the pieces to an extruder 13. Extruder 13 defines an axially elongated tubular extrusion chamber 13b, having an extruder orifice or open discharge end 13c spaced remotely from the hopper 13a. In the vicinity of hopper 13a, a compaction piston 13d is slidably mounted for axial movement relative to extruder chamber 13b. Piston 13d is reciprocated in timed relationship to the feeding of the pieces 11 by any suitable mechanism such as a hydraulic cylinder 13e. The compaction piston 13d is so located that its reciprocation successively opens and closes the extruder hopper 13a with respect to the extrusion chamber 13b. Thus, successive charges of particles 11 are fed into extrusion chamber 13b and are subjected to intermittent axial impaction and compaction by the reciprocating movements of compaction piston 13d.

For the specific application of this method to the production of thermal insulation for pipe coverings, or other cementitious materials having tubular shapes, a rod-like core members 13f is axially mounted within the extrusion chamber 13b, and passes through a central bore 13g in the piston 13d, and may conveniently provide an additional guide for the movements of the piston. In any event, the reciprocation produces successive axial compacting forces upon pieces 11, deposited from hopper 13a into the extrusion chamber 13b, in consequence whereof, there is intermittently extruded a rod-like or tubular formation of the partially reacted cementitious material from the discharge end 13c of extruder 13. As the compacted formation is extruded from extruder 13, it is axially moved on to a supporting stand 15, positioned adjacent to the discharge end 13c. Supporting stand 15 may, if desired, be of a portable nature and be utilized to transport extruded lengths of the compacted putty-like material to another location for further processing, such as to an autoclave for subsequent hardening operations.

In this connection, it should be noted that the axial compaction action of piston 13d is an important and critical factor to the successful operation of this process.

With the intermittent axial compaction of the material, as described above, the putty-like pieces or lumps of material are compacted into a consolidated formation having sufficient rigidity to maintain its extruded shape even during subsequent processing of the material, such as autoclaving to complete the reaction between the cementitious ingredients and to further harden the material.

Positioned adjacent to the discharge end 13c there is a suitable severing or cutting mechanism, schematically indicated as 14, by means of which suitable lengths of extruded insulating material may be obtained. This cutting mechanism 14 may be operated hydraulically, or by other suitable mechanisms, not illustrated, in timed relationship with the movement of piston 13d, so that the severing may be carried out during the intermittent intervals when the piston is not extruding the material. The cross-sectional configuration of the compacted material is represented in FIG. 2 as being circular, but it may also be of other various cross-sectional configurations; for example, ovular, as illustrated in FIG. 3.

As an example of a hydrous calcium silicate product which may be produced by this method, it shall be assumed that a slurry of lime, silica, and water will be used, wherein the lime and silica are present in the molar ratio of 1:1, and wherein the water to solids weight ratio is in the order of 3:1, which will result in an end product having an apparent dry density of approximately 20 p.c.f., and the slurry may, or may not, include spiculated asbestos fibers.

Such slurry may then be poured into molds of any desired shape and placed in an indurator and subjected to saturated steam at a temperature of 328° F., and a pressure of 100 p.s.i.a. At this temperature and pressure, a reaction time of approximately 90 minutes should ordinarily be sufficient to produce a partially reacted product having a putty-like consistency suitable for use in this process, regardless of the water to solids weight ratio utilized if maintained between the approximate limits of 1:1 to 9:1, previously indicated.

This partially reacted product may then be removed from the indurator and the mold, and broken up into discrete pieces or lumps capable of being fed into the hopper 11 and screw feed mechanism 12.

These pieces may then be fed or charged into the extrusion member 13 which is adapted to automatically and successively compact segregated portions of these charges in such manner as to successively build up a length of integrated mass having either a hollow or solid cross-sectional body portion defining substantially any desired peripheral configuration.

The successive building up of this mass also results, of course, in the shaping of the mass prior to issuance from the extrusion chamber. The shaped and extruded mass may then be severed into lengths of any desired lineal dimension and subjected to further pressure and temperature to complete the reaction and convert the product to its end form which, in this instance, under proper reaction conditions, would be synthetic Xonotlite, having the chemical formulation of $5CaO \cdot 5SiO_2 \cdot H_2O$.

During the compacting of these charges to form the extruded shaped mass, it will be understood that the water to solids ratio which exists in the partially reacted material will be the controlling factor in obtaining the desired apparent density in the end product. This is so because the water content constitutes the principal factor limiting the compaction of the material by virtue of the characteristically limited compressibility of the water. This is assuming, of course, that the partially reacted material has not been permitted to attain a condition whereby there will be a high vapor or water loss subsequent to the initial partial reaction. Thus, it is possible to produce a product having substantially any desired apparent density merely by controlling the initial water to solids ratio.

In the event that a product is to be produced, such as is ordinarily termed a normal hydrous calcium silicate insulating product, wherein the molar ratio of lime to silica resides in the approximate range of 0.65:1, and wherein the silica exhibits highly reactive properties such as, for example, a form of diatomaceous earth, then the time required for the partial reaction of the slurry may be reduced to approximately ten minutes when saturated steam having a pressure of about 50 p.s.i.g. is employed.

Thus, cementitious insulating materials of the calcium silicate type found to be especially suitable for production by the methods of the present invention are particularly those residing within the lime-silica molar ratios ranging from 0.65:1 to 1:1. Obviously, however, it is to be understood that various other types of cementitious insulating materials well known in the art, and similarly formed from aqueous slurries, are also considered to be suitable for the purposes of this invention. Obviously, for example other hydrous metal silicates and particularly the so-called light metal or RO group of hydrous metal silicates are capable of being processed in accordance with the improved methods and techniques of the present invention.

From the foregoing description, it will be apparent that this invention permits the continuous formation of extruded shaped bodies of cementitious materials without the requisite necessity of providing an individual mold for each shaped element so produced. As specifically applied to the formation of hydrous calcium silicate pipe coverings, it permits desired lengths of such pipe covering to be produced in a single piece without necessitating carrying an individual mold through the shaping and autoclaving process. The attendant reduction in capital investment, and manufacturing time and expense are deemed to be obvious.

It will, of course, be understood that various details of method and procedure may be modified throughout a wide range without departing from the principles of this invention, and it is, therefore, not the purpose to limit the patent granted hereon otherwise than necessitated by the scope of the appended claims.

I claim:

1. A method of continuously forming lengths of integrated, shaped, cementitious material which comprises: partially reacting and indurating a slurry of cementitious materials under the activating influence of superatmospheric steam to produce a putty-like mass; shredding said putty-like mass to produce individual lumps thereof; feeding successive charges of said lumps into the open end of an extrusion chamber; axially and repeatedly impacting each individual charge of said successive charges against a preceding charge in said extrusion chamber to thereby individually shape and integrally combine said charges and concurrently extrude same from said extrusion chamber as a continuous formation of shaped material; severing said formation into successive lengths; and subjecting the severed lengths to further reaction under the activating influence of superatmospheric steam.

2. A method of continuously forming lengths of hydrous calcium silicate insulation which comprises: providing a lime-silica slurry wherein the molar ratio of lime to silica is in the range of from approximately 0.65:1 to 1:1, and wherein the water to solids weight ratio is within the range of from approximately 1:1 to 9:1; partially reacting and partially indurating said slurry of lime and silica under the activating influence of superatmospheric steam to produce a partially hardened putty-like mass; shredding said mass to produce individual lumps thereof; feeding successive charges of said lumps into an open end of an extrusion chamber; successively and repeatedly axially impacting each said successive charge against a preceding charge within said extrusion chamber, thereby individually shaping each successive charge and integrating same with a preceding charge and extruding a continuous shaped formation from the opposite end of said chamber; and completing the reaction and induration of said extruded formation under the activating influence of superatmospheric steam.

3. A method of continuously forming lengths of hydrous calcium silicate pipe covering which comprises: providing a lime-silica slurry, wherein the molar ratio of lime to silica is in the range of from approximately 0.65:1 to 1:1, and wherein the water to solids weight ratio is within the range of from approximately 1:1 to 9:1; partially reacting said slurry of lime and silica under the activating influence of endothermic reaction conditions to transform said slurry into a semi-hardened, self-supporting putty-like mass; feeding successive charges of said putty-like mass into an open end of an axially elongated annular extrusion chamber; successively and repeatedly axially impacting each said successive charge of said putty-like mass against a preceding charge within said extrusion chamber, thereby individually shaping each such charge and forming and concurrently extruding a continuous tubular formation from the opposite end of said chamber, and completing the reaction and induration of said extruded tubular formation under the activating influence of endothermic reaction conditions.

4. A method of continuously forming lengths of hydrous calcium silicate pipe covering which comprises: providing a lime-silica slurry, wherein the molar ratio of lime to silica is in the range of from approximately 0.65:1 to 1:1, and wherein the water to solids weight ratio is within the range of from approximately 1:1 to 9:1; partially reacting said slurry of lime and silica under the activating influence of superatmospheric steam for a length of time sufficient to produce a self-supporting putty-like mass of chemically combined calcium silicate material; shredding said mass to produce individual lumps thereof; feeding successive charges of said lumps into an open end of an axially elongated annular extrusion chamber; successively and repeatedly axially impacting each said successive charge against a preceding charge within said extrusion chamber, thereby individually shaping each such charge and forming and concurrently extruding a continuous tubular formation from the opposite end of said chamber; severing said tubular extrusion into separate lengths; and heating said lengths to complete the reaction of the partially reacted calcium silicate material.

5. A method of continuously forming integrated lengths of a light metal silicate insulating material having an integrated microporous crystalline structure which comprises the steps of: forming a slurry of reactive materials, said reactive materials consisting essentially of a light metal and silica dispersed in water; indurating said slurry under the activating influence of heat to transform said slurry into a chemically combined light metal silicate body of material having an integrated microporous structure; interrupting said indurating step when said slurry has reacted sufficiently to form a body of semi-indurated material having a self-supporting state of transformation; feeding said semi-indurated material into the open end of an extrusion chamber; axially and repeatedly impacting said semi-indurated material in said extrusion chamber to thereby shape and concurrently extrude same from said extrusion chamber as a continuous formation of shaped material; and completing said indurating step by subjecting said shaped material to further reaction under the activating influence of heat to complete the reaction and induration of said reactive materials.

6. A method of continuously forming integrated lengths of a light metal silicate insulating material having an integrated microporous crystalline structure which comprises the steps of: forming a slurry of reactive materials, said reactive materials consisting essentially of a light metal and silica dispersed in water; indurating said slurry under the activating influence of heat to transform said slurry into a chemically combined light metal silicate body of material having an integrated microporous structure; interrupting said indurating step when said slurry has reacted sufficiently to form a body of semi-indurated material having a self-supporting state of transformation; shredding said semi-indurated material into lumps; feeding the shredded semi-indurated material into the open end of an extrusion chamber; axially and repeatedly impacting said shredded semi-indurated material in said extrusion chamber to thereby shape, combine and concurrently extrude same from said extrusion chamber as a continuous formation of shaped material; severing said formation into successive lengths; and completing said indurating step by subjecting the severed lengths to further reaction under the activating influence of heat to complete the reaction and induration of said reactive materials.

7. A method of continuously forming integrated lengths of a light metal silicate insulating material having an integrated microporous crystalline structure which comprises the steps of: forming a slurry of reactive materials consisting essentially of a finely divided metal selected from the RO group and silica dispersed in water; reacting said slurry under endothermic reaction conditions for a length of time sufficient to transform the slurry into an integrated, self-supporting body of material having a microporous RO metal silicate structure; interrupting said reaction when said slurry has attained a pliable, semi-indurated, self-supporting state of transformation; feeding said pliable, semi-indurated material into the open end of an extrusion chamber; axially and repeatedly impacting same in said extrusion chamber to thereby shape, integrally combine and concurrently extrude from said extrusion chamber a continuous formation of shaped, semi-indurated material; severing said formation into successive lengths; and subjecting the severed lengths to further reaction under endothermic reaction conditions for a length of time sufficient to complete the reaction and induration of the slurry reactants.

8. A method of continuously forming integrated lengths of a calcium silicate insulating material having an integrated microporous crystalline structure which comprises the steps of: transforming a slurry of finely divided reactive materials consisting essentially of lime and silica dispersed in water into a body of chemically combined hydrous calcium silicate material having an integrated microporous structure by subjecting said slurry to the activating influence of superatmospheric steam, said slurry having a molar ratio of lime to silica in the range of from approximately 0.65:1 to 1:1; interrupting said transformation when said slurry has attained a semi-indurated, self-supporting but pliable state of transformation; feeding the semi-indurated material into the open end of an extrusion chamber; axially and repeatedly impacting said semi-indurated material in said extrusion chamber to thereby shape and integrally combine and concurrently extrude from said extrusion chamber a continuous formation of shaped material; and subjecting the shaped formation to further transformation under the activating influence of superatmospheric steam to complete the transformation and induration of said reactive materials.

9. A method of forming a continuous body of integrated, shaped, cementitious material which comprises: partially reacting and indurating a slurry of cementitious materials under the activating influence of heat to transform said slurry into a putty-like mass; feeding successive charges of said partially reacted and indurated putty-like mass into an extrusion chamber; repeatedly impacting each successive charge against a preceding charge in said extrusion chamber to thereby integrate, shape and extrude said charges from said extrusion chamber as a continuous, integrated formation of shaped material.

10. The method according to claim 9, wherein said slurry of cementitious materials consists essentially of a reactive aqueous slurry of calcareous and silicious constituents.

11. The method according to claim 9, wherein said charges are fed successively into an annular extrusion chamber to thereby integrate, shape and extrude said charges as a continuous, integrated, annular formation of shaped material.

References Cited by the Examiner
UNITED STATES PATENTS

| | | | |
|---|---|---|---|
| 2,338,203 | 1/44 | Reedman | 25—15 |
| 2,547,127 | 4/51 | Kalousek | 18—47.5 |
| 2,604,662 | 7/52 | Bodkin | 18—57.5 |
| 2,617,169 | 11/52 | Bodkin | 18—12 |
| 2,783,499 | 3/57 | Billen | 18—12 |
| 2,749,590 | 6/56 | Kilpatrick | 25—15 |
| 2,754,547 | 7/56 | Allen | 18—47.5 |
| 2,879,546 | 3/59 | Hemphill | 18—47.5 |

ALEXANDER H. BRODMERKE, *Primary Examiner.*

WILLIAM J. STEPHENSON, ROBERT F. WHITE,
*Examiners.*